United States Patent [19]

Brengman et al.

[11] 3,726,208
[45] Apr. 10, 1973

[54] COMMINUTING METHOD AND APPARATUS

[75] Inventors: Fred C. Brengman; Keith Brengman, both of Carroll; James L. Anderson, Marysville, all of Ohio

[73] Assignee: Societe D' Assistance Technique Pour Produits Nestle S.A., Lausanne, Switzerland

[22] Filed: Dec. 29, 1970

[21] Appl. No.: 102,362

[30] Foreign Application Priority Data

Nov. 4, 1970 Switzerland..........................16342/70

[52] U.S. Cl.............................................99/233.11
[51] Int. Cl................................................B02c 18/00
[58] Field of Search..................146/89, 90, 98, 76 R, 146/222; 241/74, 87, 88, 90, 117, 118, 228, 236

[56] References Cited

UNITED STATES PATENTS 3,082,806   3/1963   Peterson................................146/98
233,829    11/1880   Adt.......................................146/76 R Primary Examiner—Willie G. Abercrombie
Attorney—Watson, Leavenworth & Kelton

[57] ABSTRACT

A comminuting apparatus comprises a central feeding means, cutting discs mounted on rotatable shafts disposed around the feeding means, a cage surrounding the discs and movable relative thereto and a housing around the cage for collecting comminuted material. In operation the discs and cage are rotated and the material, fed centrally, is subdivided between the discs and the cage so that once pieces of the desired size are obtained they leave through openings in the cage. Other features of the invention appear in the following specification and drawings.

14 Claims, 3 Drawing Figures

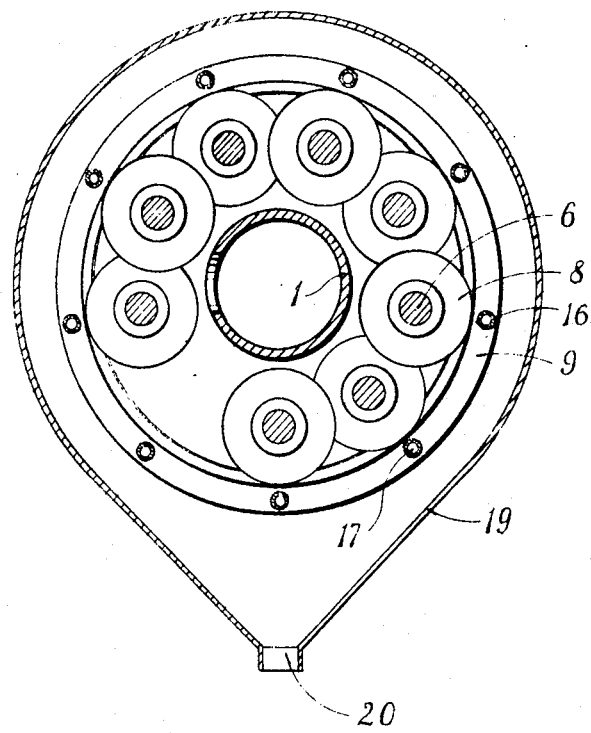
Fig_3

COMMINUTING METHOD AND APPARATUS

This invention is concerned with a grinder particularly suitable for comminuting frozen vegetable extracts. It is also concerned with a method of comminuting friable materials.

In the freeze-drying of liquids, such as tea or coffee extracts, it is generally desirable to dry the frozen material in subdivided state, and an even granulometry helps to improve the appearance of the dried product. At the same time, very fine particles (i.e. those passing through a 0.25 mm sieve) are avoided because of their dusty aspect and the problems they cause during freeze-drying. Furthermore, such fine particles reconstitute less easily with water.

Frozen tea and coffee extracts are extremely friable materials the grinding of which needs to be carried out with care in order to avoid the production of excessive amounts of fine particles. In this respect, the currently used hammer mills give 25 to 30 percent fines which need to be separated and/or recycled in some way, at the expense of efficiency.

An object of the present invention is to provide a grinder for friable materials such as frozen tea or coffee extract, which is both efficient and which provides comminuted material of even granulometry with a very low proportion of fine particles, generally below 10 percent.

Another object of the invention is to provide a method of subdividing friable materials.

The grinder according to the invention comprises a central feeding means for the material to be comminuted, rotatable shafts each carrying a plurality of cutting discs disposed around the feeding means, means for rotating the shafts, a cage exterior to the discs and movable relative thereto and a housing surrounding the discs for collecting the comminuted material.

In a preferred embodiment, the cage is made up of spaced rings rotatable around the discs.

The method of grinding friable materials comprises introducing the material into the center of a series of rotating cutting discs, bringing the product into a confined space between said discs and an external cage moving relative to the discs, whereby the material is subdivided and causing the subdivided material to pass through the cage.

A preferred embodiment of a grinder according to the invention is shown, by way of example, in the accompanying drawing, in which:

FIG. 3 is a transverse section along III — III of FIG. 1.

Figure 1:
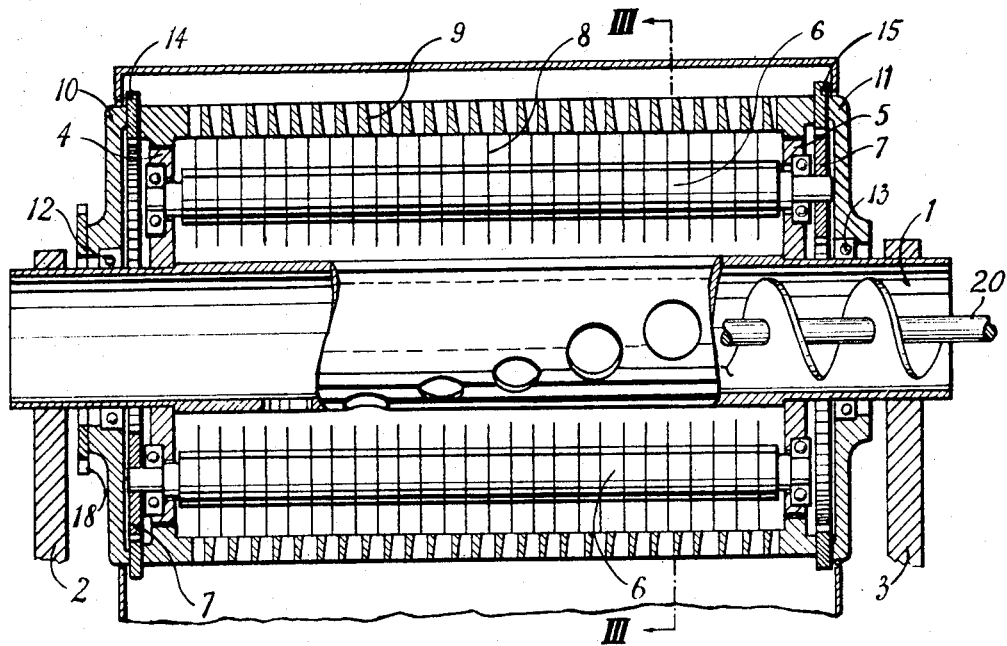
FIG. 1 is a longitudinal section of the grinder.

As shown in the drawing (FIG. 1) the grinder comprises a central tube 1 held by two supports 2 and 3. This central tube has openings disposed along a spiral line and surrounds advancing means for the material to be comminuted, such as an auger 20 driven by a motor.

The central tube 1 supports two flanges 4 and 5 in which shafts 6 are journalled parallel to the tube, each shaft having a driving pinion 7 and carrying a series of cutting discs 8. As shown in FIG. 3, the shafts 6 are not evenly distributed on the circumference of the flanges 4, 5 in order to leave a space for the material opposite the openings in the central tube 1.

A cylindrical cage is made up of a stack of rings 9 held between flanges 10 and 11 mounted on the central tube 1 on bearings 12, 13. This cage is provided with rings 14, 15 having internal teeth meshing with the pinions 7. Spacers 16 are provided between the rings 9 and the stack is held together by rods 17 passing through the flanges 10, 11.

The flange 10 is provided with a cog wheel 18 driven by a motor (not shown).

Figure 2:
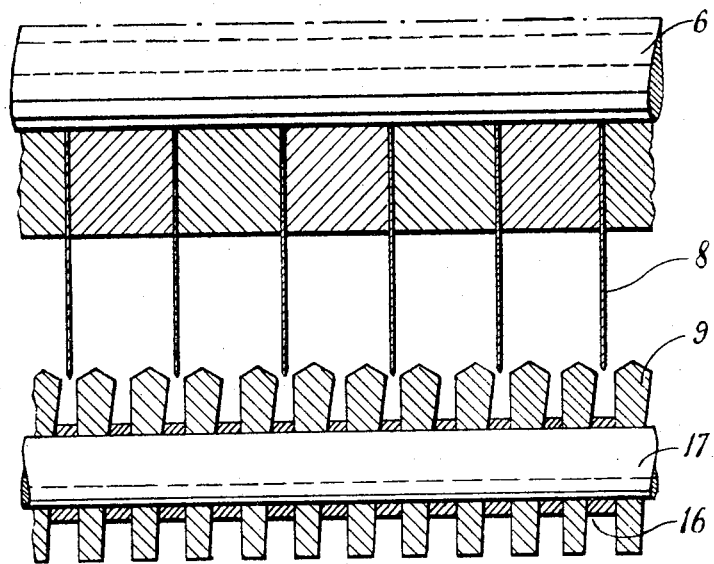
FIG. 2 is an enlarged detail view of a part of the grinder shown in FIG. 1.

The cooperation between the cutting discs 8 and the rings 9 of the cage is shown in detail in FIG. 2. Along each shaft 6, the number of discs 8 is a half of the number of spaces openings between the rings 9 so that the discs on adjacent shafts intermesh, as shown in FIG. 3 and further that each cutting disc 8 is readily aligned with a cage opening. The rings 9 are profiled so that the space between adjacent rings increases from the inside to the outside and the cage thus acts as a calibrating sieve. Further, the inner surfaces of the rings 9 are inclined as shown in FIG. 2 so that adjacent rings define a convergingly inclined entry course to the cage openings defined by such rings.

A housing 19, having an outlet 20 for comminuted product, surrounds the cage.

In operation, the cage, driven by a motor, rotates about the central tube 1 and at the same time drives the shafts 6 and cutting discs 8 via rings 14, 15 and pinions 7.

The material is fed into the tube 1 from the right in FIG. 1. It is advanced by auger 20 and drops through the openings of the tube 1 into the space between the shafts at the bottom of the cage. The disposition of the openings along a spiral line ensures even distribution of the material along the whole length of the cage.

The material is essentially cut between the rings 9 of the cage and the cutting discs 8 without substantial crushing, thus minimizing the production of fines, and the particles leave the cage immediately after they have been subdivided to the desired size which is set by the spacing between the rings 9. There is thus no undesirable attrition by recycling of product having the required granulometry. The subdivided material collects within the housing 19 and may be removed through the outlet 20.

The grinder is especially suitable for subdividing frozen tea or coffee extracts prior to freeze-drying. By "frozen" is meant that the extract is in solid, although friable condition, so that its temperature is generally below about −30°C, depending on its solids concentration.

The invention is further illustrated by the following examples in which the percentages are by weight.

EXAMPLE 1

Frozen coffee extract containing 40 percent solids, in pieces about 5 cm in size is fed at a rate of 40 kg per minute into a grinder of the type described with reference to the accompanying drawing, located in a refrigerated chamber. The cage, rotated at 180 r.p.m., is made up of rings of 50 cm external diameter spaced at 2 mm. The peripheral speed of the interior of the cage and of the cutting edge of the discs is 300 m per minute. The subdivided product contains only about 7 percent of fine particles passing through a 0.25 mm sieve. All the particles pass through a 2 mm sieve. The proportion of fines may be further lowered by reducing the throughput.

EXAMPLE 2

Frozen tea extract containing about 30 percent solids, is prebroken to pieces about 5 cm in size. The pieces are fed at a rate of 40 kg per minute into a grinder as herein described. The cage is rotated at 210 r.p.m. and the rings, of 50 cm external diameter, are spaced at 1.9 mm. The cutting edges of the discs have a peripheral speed of 350 m per minute.

The ground material contains about 9 percent of fine particles passing through a 0.25 mm screen; all particles pass a 2 mm screen.

We claim:

1. A grinder comprising a central feeding means for the material to be comminuted, a plurality of rotatable shafts each carrying a plurality of cutting discs disposed encirclingly around the feeding means, means for rotating the shafts, an encircling cage exterior to the discs movable relative thereto, said cage having openings therein, each of said cage openings being radially aligned with one of said discs, and a housing surrounding the cage for collecting the comminuted material.

2. A grinder according to claim 1 in which the cage is made up of spaced rings rotatable around the discs, the spaces between said rings defining said cage openings.

3. A grinder comprising a central feeding means for the material to be comminuted and including an auger mounted within a central tube provided with openings, a plurality of rotatable shafts each carrying a plurality of cutting discs disposed encirclingly around the feeding means, means for rotating the shafts, an encircling cage exterior to the discs and movable relative thereto, said cage having openings therein, each of said cage openings being radially aligned with one of said discs, and a housing surrounding the cage for collecting the comminuted material.

4. A grinder according to claim 3 in which the openings in the central tube are disposed along a spiral line.

5. A grinder comprising a central feeding means for the material to be comminuted and an auger mounted within a central tube provided with openings, a plurality of rotatable shafts each carrying a plurality of cutting discs disposed encirclingly around the feeding means, said shafts being parallel to said central tube to which are attached two flanges in which the shafts are rotatably mounted, means for rotating the shafts, an encircling cage exterior to the discs and movable relative thereto, said cage having openings therein, each of said cage openings being radially aligned with one of said discs, and a housing surrounding the cage for collecting the comminuted material.

6. A grinder according to claim 5 in which the feeding means comprises an auger mounted within the central tube.

7. A grinder according to claim 6 in which the openings in the central tube are disposed along a spiral line.

8. A grinder according to claim 5 in which each shaft is provided with a driving pinion and the cage is provided with rings with internal teeth meshing with the shaft pinions.

9. A grinder comprising a central feeding means for the material to be comminuted, a plurality of rotatable shafts each carrying a plurality of cutting discs disposed encirclingly around the feeding means, means for rotating shafts, an encircling cage exterior to the discs and movable relative thereto, said cage having openings therein, each of said cage openings being radially aligned with one of said discs, said cage comprising spaced rings rotatable around the discs, the spaces between said rings defining said cage openings, the thickness of the rings decreasing from insdie to outside the cage, and a housing surrounding the cage for collecting the comminuted material.

10. A grinder according to claim 5 in which the cage is made up of spaced rings rotatable around the discs.

11. A grinder according to claim 10 in which the thickness of the rings decrease from inside to outside the cage.

12. A method of subdividing a friable solid material which comprises advancing the material along an axis parallel to and spaced radially inwardly of the axes about which rotating cutting discs are being rotated, and then moving the material between said discs and an external cage moving relative to the discs and having openings radially aligned with said discs to cut said material, and cause the cut material to pass through the cage openings.

13. A method according to claim 12 in which the friable material is frozen tea or coffee extract.

14. A grinder according to claim 2 in which said rings have inclined inner surfaces, the inner surfaces of adjacent ones of said rings defining a convergingly inclined entry course to said cage openings.

* * * * *